United States Patent
Rozzi et al.

(10) Patent No.: US 9,602,835 B2
(45) Date of Patent: Mar. 21, 2017

(54) DIFFERENCE IMAGES AND DIFFERENCE IMAGE STRIPS

(71) Applicant: ReallyColor, LLC, Glenview, IL (US)

(72) Inventors: William A. Rozzi, Collierville, TN (US); Dieter T. Marlovics, Glenview, IL (US); Matthew N. Klein, Chicago, IL (US)

(73) Assignee: ReallyColor, LLC, Chicago, IL (US)

(*) Notice: Subject to any disclaimer, the term of this patent is extended or adjusted under 35 U.S.C. 154(b) by 140 days.

(21) Appl. No.: 14/614,638

(22) Filed: Feb. 5, 2015

(65) Prior Publication Data

US 2015/0222931 A1 Aug. 6, 2015

Related U.S. Application Data

(60) Provisional application No. 61/936,201, filed on Feb. 5, 2014.

(51) Int. Cl.
*G06K 9/36* (2006.01)
*H04N 19/593* (2014.01)

(52) U.S. Cl.
CPC ................... *H04N 19/593* (2014.11)

(58) Field of Classification Search
USPC .......... 382/232, 236; 348/148; 701/409, 472
See application file for complete search history.

(56) References Cited

U.S. PATENT DOCUMENTS 5,517,419 A * 5/1996 Lanckton ............... G01C 11/02
348/148

FOREIGN PATENT DOCUMENTS

GB 341811 1/1931

OTHER PUBLICATIONS

Wiegand, T. Multi-Frame Motion-Compensated Prediction for Video Transmission—Draft. Boston, Kluwer Academic Publishers, May 23, 2001. pp. i-xxii and 1-150.

* cited by examiner

*Primary Examiner* — Anh Do
(74) *Attorney, Agent, or Firm* — Fogg & Powers LLC (57) ABSTRACT

Techniques described herein convert a plurality of digital images into an image or images more amenable to data compression. In one embodiment, an ordered collection of input digital images is provided. A first digital image from the ordered collection is identified as a base image, and an empty image strip is formed. For each second digital image from the ordered collection, and upon a condition in which the second image is the base image, the base image is appended to the image strip. Upon a condition in which the second image is not the base image, a difference image is computed from the base image and the second image and appended to the difference image to the image strip. Quantization and conventional image compression may be applied to the image strip to produce a compressed image strip.

14 Claims, 4 Drawing Sheets

DIFFERENCE IMAGES AND DIFFERENCE IMAGE STRIPS

CROSS-REFERENCE TO RELATED APPLICATIONS

This application claims priority to U.S. Provisional Application Ser. No. 61/936,201, same title herewith, filed on Feb. 5, 2014, which is incorporated in its entirety herein by reference.

TECHNICAL FIELD

The disclosure relates to processing of digital images and, more particularly, to compression of a collection of digital images.

BACKGROUND

Transmission and storage of digital images are routine operations for networked computing devices. Digital images represent a substantial fraction of the volume of data necessary to represent a web page. Although network speed and data storage capacity have steadily increased with time, enabling the transmission and storage of ever larger digital images, there are advantages to reducing image data file sizes via compression. For example, web hosting services often charge their client web site owners on the basis of one or more of per file download, per megabyte transferred, and per megabyte of storage. Minimizing file sizes for images stored on a web server or the number and size of files delivered by a web server to a user's web browser can lead to substantial cost savings for hosted web site owners.

Image compression techniques such as those associated with the standard JPEG and PNG image file formats are commonly employed to reduce image storage and transmission requirements. Generally, digital images comprised of few colors or large areas of uniform color compress better than highly-detailed or textured images. Although compression ratios produced by the standard algorithms can be significant, in certain circumstances there is room for further improvement.

For the reasons stated above and for other reasons stated below which will become apparent to those skilled in the art upon reading and understanding the present specification, there is a need in the art for a method that effectively and efficiently exploits the similarity between a plurality of digital images during compression.

SUMMARY

The above-mentioned problems of current systems are addressed by embodiments of the present invention and will be understood by reading and studying the following specification. The following summary is made by way of example and not by way of limitation. It is merely provided to aid the reader in understanding some aspects of the invention.

In one example, a method for compression of a plurality of digital images is provided. The method comprises receiving an ordered collection of input digital images, identifying a first digital image from the ordered collection of input digital images as a base image, and forming an empty image strip. The method further comprises, for each second digital image from the ordered collection of input digital images, and upon a condition in which the second image is the base image, appending the base image to the image strip. The method also comprises, upon a condition in which the second image is not the base image, computing a difference image from the base image and the second image and appending the difference image to the image strip. The method further comprises applying compression to the image strip to produce a compressed image strip.

In another example, a method for compression of a plurality of digital images is provided. The method comprises receiving an ordered collection of input digital images, identifying a first digital image from the ordered collection of input digital images as a base image, and forming an empty image strip. The method further comprises, for each second digital image from the ordered collection of input digital images, and upon a condition in which the second image is the base image, appending the base image to the image strip. The method also comprises, upon a condition in which the second image is not the base image, computing a difference image from the base image and the second image and appending the difference image to the image strip. The method further comprises applying quantization to the image strip to produce a quantized image strip, and applying compression to the quantized image strip to produce a compressed image strip.

In a further example, an alternate method for compression of a plurality of digital images is provided. The method comprises receiving a plurality of input digital images, identifying a first digital image from the plurality of input digital images as a base image, and forming an empty set of output images. The method also comprises, for each second digital image from the plurality of input digital images, and upon a condition in which the second image is the base image, adding the base image to the set of output images. The method further comprises, upon a condition in which the second image is not the base image, computing a difference image from the base image and the second image and adding the difference image to the set of output images. The method also comprises applying compression to all images in the output image set to produce a compressed image set.

In another example, a method for compression of a plurality of digital images is provided. The method comprises receiving a plurality of input digital images, identifying a first digital image from the plurality of input digital images as a base image, and forming an empty set of output images. The method also comprises, for each second digital image from the plurality of input digital images, and upon a condition in which the second image is the base image, adding the base image to the set of output images. The method further comprises, upon a condition in which the second image is not the base image, computing a difference image from the base image and the second image and adding the difference image to the set of output images. The method also comprises applying quantization to all images in the output image set to produce a quantized image set, and applying compression to all images in the quantized image set to produce a compressed image set.

In an added example, a tangible computer-readable medium is provided that comprises instructions for causing a programmable processor to perform operations. The instructions include receiving an ordered collection of input digital images, identifying a first digital image from the ordered collection of input digital images as a base image, and forming an empty image strip. The instructions further include, for each second digital image from the ordered collection of input digital images, and upon a condition in which the second image is the base image, appending the base image to the image strip. The instructions also include, upon a condition in which the second image is not the base image, computing a difference image from the base image and the second image and appending the difference image to the image strip. The instructions further include applying compression to the image strip to produce a compressed image strip.

In another example, a computing device comprising one or more processors is provided. The computing device is configured to perform operations comprising receiving an ordered collection of input digital images, identifying a first digital image from the ordered collection of input digital images as a base image, and forming an empty image strip. The operations further comprise, for each second digital image from the ordered collection of input digital images, and upon a condition in which the second image is the base image, appending the base image to the image strip. The operations also comprise, upon a condition in which the second image is not the base image, computing a difference image from the base image and the second image and appending the difference image to the image strip. The operations additionally comprise applying compression to the image strip to produce a compressed image strip.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

The present invention can be more easily understood and further advantages and uses thereof will be more readily apparent, when considered in view of the detailed description and the following Figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention relate to the compression of a collection of digital images exhibiting a high degree of similarity to improve at least the performance of an image processing system, required storage space, size of data files and file transfer speeds. Such a collection may, for example, result from modifications of an original image or from snapshots of a fixed scene over time. Still image compression techniques, applied individually to images in such a collection, do not benefit from the correlation between images in the set. Embodiments exploit the similarity between a collection of still images to allow for increased compression ratios, particularly when arranged as an image strip, that is, when concatenated vertically or horizontally into a single image.

Techniques of the present disclosure allow a computing device to convert a plurality of digital images into a compressed image strip or compressed image set. A digital image may be represented as one or more two-dimensional arrays of digital values called picture elements, more commonly referred to as pixels. Each two-dimensional pixel array comprising the digital image may be called a component or a channel. An image with one channel is often referred to as a grayscale image. Three channels may represent color images, for example an RGB image, comprised of one channel for each of a red, green, and blue component. Other representations are also possible, including CMYK, for cyan, magenta, yellow, and black components. An image's two-dimensional pixel array has a number of pixels along one dimension, called the width, and another number of pixels along the other dimension, called the height. The two numbers, width and height, are collectively referred to as the size of the image.

Figure 1:
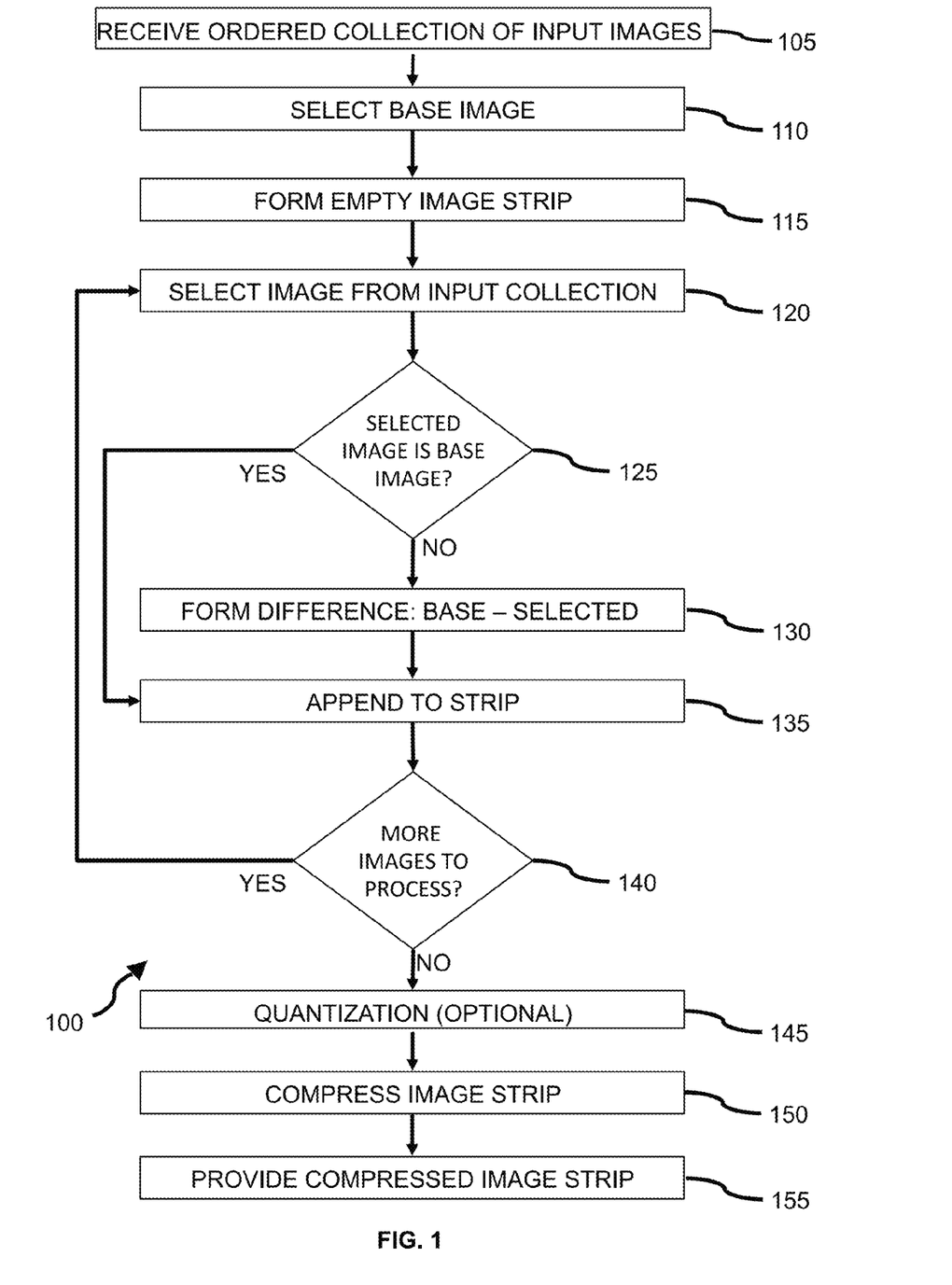
FIG. 1 is a flow chart illustrating an example method that may be performed by a computing device to compress a collection of digital images into a compressed image strip, in accordance with one or more aspects of the present disclosure.

FIG. 1 is a flow chart illustrating an example method 100 that may be performed by a computing device to compress a collection of digital images into a compressed image strip, in accordance with one or more aspects of the present disclosure. For example, method 100 may be performed by computing device 2 shown in FIG. 4.

Method 100 includes receiving an ordered collection of digital input images (105) to be compressed into a compressed image strip. An ordered collection of digital images is a plurality of digital images and an associated sequential ordering of the images. A sequential ordering of digital input images from an initial, unordered collection of images may be determined on the basis of a number of image attributes including, but not limited to: (a) random ordering (that is, unordered), (b) manual ordering, (c) temporal ordering, such as based on a timestamp or order of generation or arrival, (d) automated ordering, such as orderings based on image analysis, and (e) ordering based on a generator parameter, such as, for example, based on a filter parameter used to generate multiple filtered versions of an original image.

In step (110), a base image is selected from the ordered collection of digital input images received in step (105). Identification of the base image as one of the plurality of images in the ordered collection of digital input images may be based on the associated sequential ordering of the images in the collection. Methods for selecting the base image from the ordered collection of digital input images include, but are not limited to, selecting the first image in the sequence, selecting the last image in the sequence, and selecting an image close to the middle of the sequence.

An empty image strip is formed in step (115). An image strip is a single image comprised of a multidimensional arrangement of zero or more component images. A basic image strip is an image formed as a linear arrangement of component images, wherein each component image is vertically or horizontally adjacent to one or more other component images. 2- or 3-dimensional image strip arrangements are also possible, such as a single image composed of a 2-dimensional grid of component images. An empty image strip is an image strip containing no component images.

Each digital input image from the ordered collection is selected (120) in turn according to the collection's associated sequential ordering. Decision step (125) determines whether the selected image is the base image. If the selected image is the base image, then the selected image is appended (135) to the image strip. If the selected image is not the base image, then a difference image is formed from the base image and the selected image 130 and the difference image is appended (135) to the image strip. The processes of forming a difference image and of appending an image to an image strip are described below.

Decision step (140) determines whether any images from the collection of digital input images remain to be processed. If so, flow returns to image selection (120). If not, a quantization operator (145) is optionally applied to the image strip. Quantization is a general lossy data compression technique wherein a range of values are replaced by a single representative value. Reducing the number of distinct values in a given data stream makes the data stream more compressible. Image quantization generally involves collapsing multiple pixel value ranges into corresponding representative values.

If optional quantization operator (145) is applied to the image strip, then the quantized image strip is compressed (150). If optional quantization operator (145) is not applied to the image strip, then the image strip is compressed (150). Compression step (150) may be implemented using conventional data compression techniques such as LZW or ZIP, which would require an explicit decompression step prior to decoding of the image strip. Compression step (150) may also be performed implicitly while formatting the image strip in, for example, the common JPEG or PNG file formats, allowing decoding of the image strip to occur in web browsers or image processing applications such as Adobe Photoshop. The output of compression operator (150) is provided as the compressed image strip (155).

A component image is appended (135) to an existing image strip by increasing the size of the image strip so as to accommodate copying the component image pixel values into the size-adjusted image strip. Assume that a number M of component images are to be added to an initially empty image strip, that all component images have the same pixel width, W, pixel height, H, and number of channels, N, and, without loss of generality, that a horizontal image strip is desired. Appending a first component image to the empty image strip results in an intermediate image strip with width W, height H, and N channels, containing a copy of the first component image. Appending a second component image to the intermediate image strip proceeds by first expanding the width of the intermediate image strip to 2*W, where, again without loss of generality, the added image columns (W of them) are assumed to be added to the right side of the intermediate image strip. The second component image's pixel values are then copied into the expanded intermediate image strip. Proceeding to append the remaining M−2 component images to the image strip in a similar fashion results in a final image strip which is a single horizontal image having width M*W, height H, and number of channels N, containing one copy of each of the M component images. Notably, if the component images have differing widths or heights, all component images should be first padded with pixels of an appropriate background color so that all padded component images have the same width and height.

A difference image may be formed from a base image and a component image (130) using methods such as, but not limited to, subtraction. For example, for the case where images have floating-point pixel representations, a difference image D may be formed from a base image B and component image I by subtracting I from B on a per-channel and per-pixel basis:

$$D[c][i][j]=B[c][i][j]-I[c][i][j],$$

where c, i, and j are channel, row, and column indexes, respectively. The component image may subsequently be reconstructed from the difference image and base image as:

$$I[c][i][j]=B[c][i][j]-D[c][i][j].$$

For the more common case where image pixel values have an unsigned 8-bit representation, difference images may be formed, for example, by subtraction with scalar weights and an offset bias:

$$D[c][i][j]=(\tfrac{1}{2})*(255+B[c][i][j]-I[c][i][j]),$$

which results in difference image pixel values D[c][i][j] in the allowable 8-bit range of 0 to 255. Reconstruction of the component image in this case uses the formula:

$$I[c][i][j]=255+B[c][i][j]-2*D[c][i][j].$$

Figure 2:
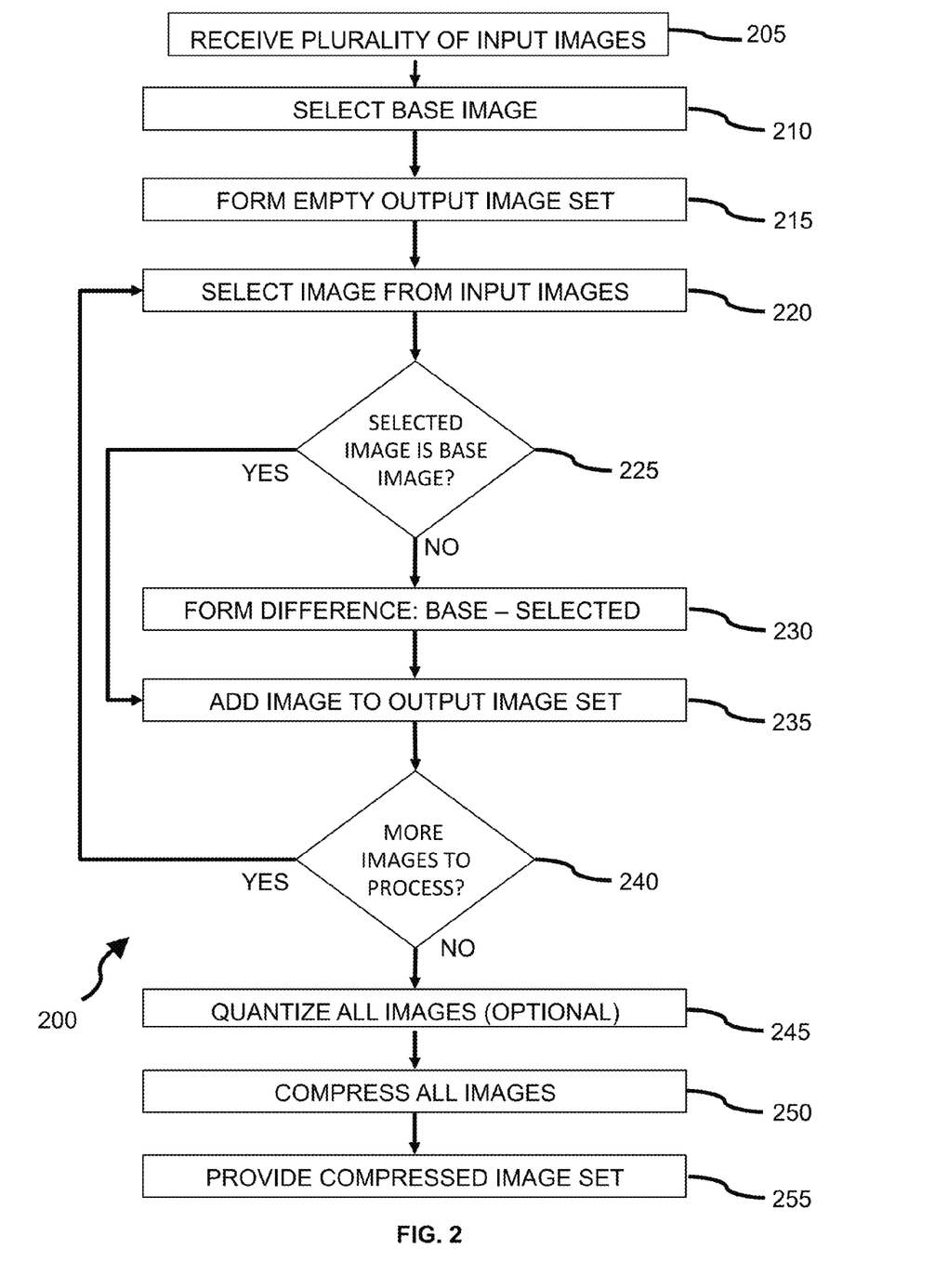
FIG. 2 is a flow chart illustrating an example alternative method that may be performed by a computing device to compress a collection of digital images into a compressed image set, in accordance with one or more aspects of the present disclosure.

FIG. 2 is a flow chart illustrating another example method 200 that may be performed by a computing device to compress a collection of digital images into a compressed image strip, in accordance with one or more aspects of the present disclosure. For example, method 200 may be performed by computing device 2 shown in FIG. 4.

Method 200 includes receiving a plurality of digital input images (205) to be compressed into a compressed image set. A base image is selected (210) from the collection of digital input images received in step (205). Identification of the base image as one of the plurality of images of digital input images may be based on a first determination of an associated sequential ordering of the images using methods as described above, followed by methods for selecting a base image from an ordered collection of digital input images as in step (210) above, or any other method of selecting one image from the plurality of digital input images that may be employed.

An empty set of output images is formed in step (215). Each digital input image from the plurality of digital input images is then selected (220) in turn. Decision step (225) determines whether the selected image is the base image. If the selected image is the base image, then the selected image is added (235) to the output image set. If the selected image is not the base image, then a difference image is formed from the base image and the selected image (230) and the difference image is added (235) to the output image set.

Decision step (240) determines whether any images from the plurality of digital input images remain to be processed. If so, flow returns to image selection (220). If not, a quantization operator (245) is optionally applied to each image in the output image set to form a quantized image set. If optional quantization operator (245) is applied to the output image set, then each image in the quantized image set is compressed (250). If optional quantization operator (245)

is not applied to the output image set, then each image in the output image set is compressed (250). Just as with method 100, here compression step (250) may be implemented using conventional data compression techniques such as LZW or ZIP, or compression step (250) may be performed implicitly while formatting the images in the set with a common image file format like JPEG or PNG. The output of compression step (250) is provided as the compressed image set 255.

Figure 3A:
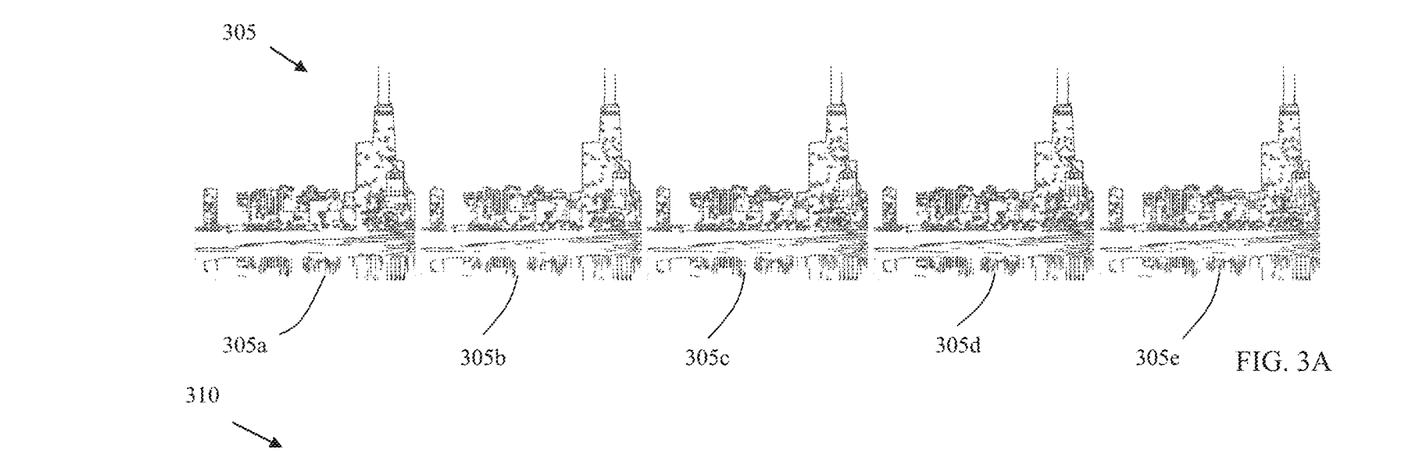
FIG. 3A illustrates an example of an ordered collection of digital images input.
Figure 3B:
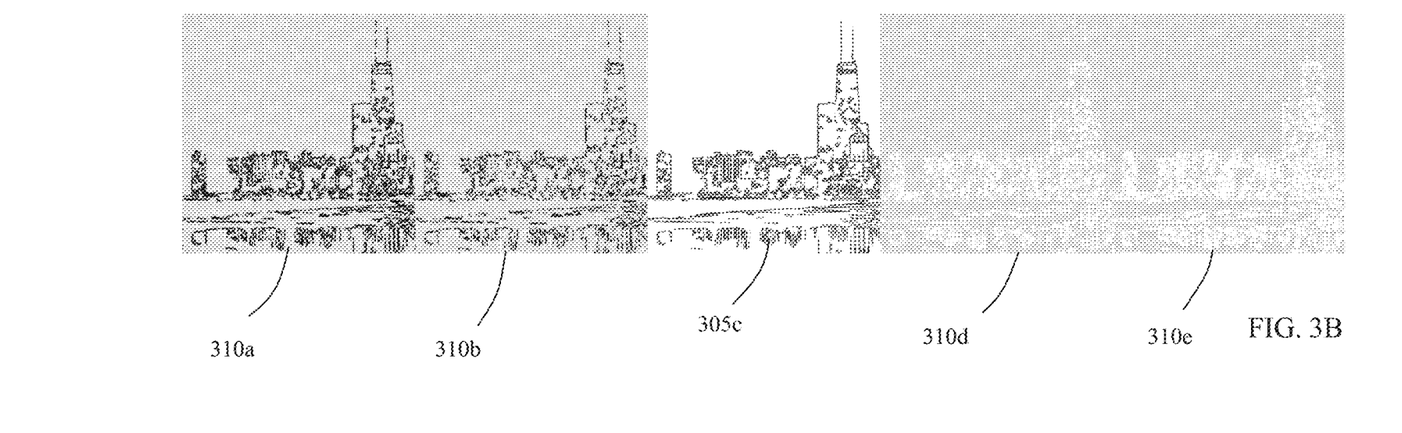
FIG. 3B illustrates a difference image strip in accordance with one or more aspects of the present disclosure.

FIG. 3A illustrates an example of an ordered collection of digital images input 305. FIG. 3B illustrates a corresponding difference image strip 310 that is generated from a plurality of digital input images 305a, 305b, 305c, 305d and 305e in the digital image input 305. In this example, the collection of digital images 305a, 305b, 305c, 305d and 305e has been substantially ordered by increasing count of black pixels. Furthermore, in this example embodiment, the digital input image 305c has been identified as the base image. The difference image strip 310 is then generated in accordance with the flow chart in FIG. 1, wherein each difference image 310a, 310b, 310d and 310e is appended to an initially empty difference image strip for each respective digital input image 305a, 305b, 305d and 305e that is not the base image 305c. The base image 305c is appended to the difference image strip 310 without modification. For example, digital input image 305c (or first digital image) has been identified as the base image in this example embodiment, and it therefore appears within the difference image strip 310 without modification as illustrated in FIG. 3B. Digital input image 305d (or second digital image or additional digital image), however, is not the base image 305c and so a difference image 310d is formed from digital input image 305d and digital input image 305c, the base image. Difference image 310d is appended to the difference image strip 310. Notably, difference image 310d has larger areas of uniform background color, making it more, compressible. Similarly, difference images 310a, 310b and 310c will be formed respectively from a difference between each additional input image 305a, 305b and 305e and the base image 305c. Difference image strip 310 may undergo quantization and compression via conventional image compression techniques prior to storage or transmission.

Figure 4:
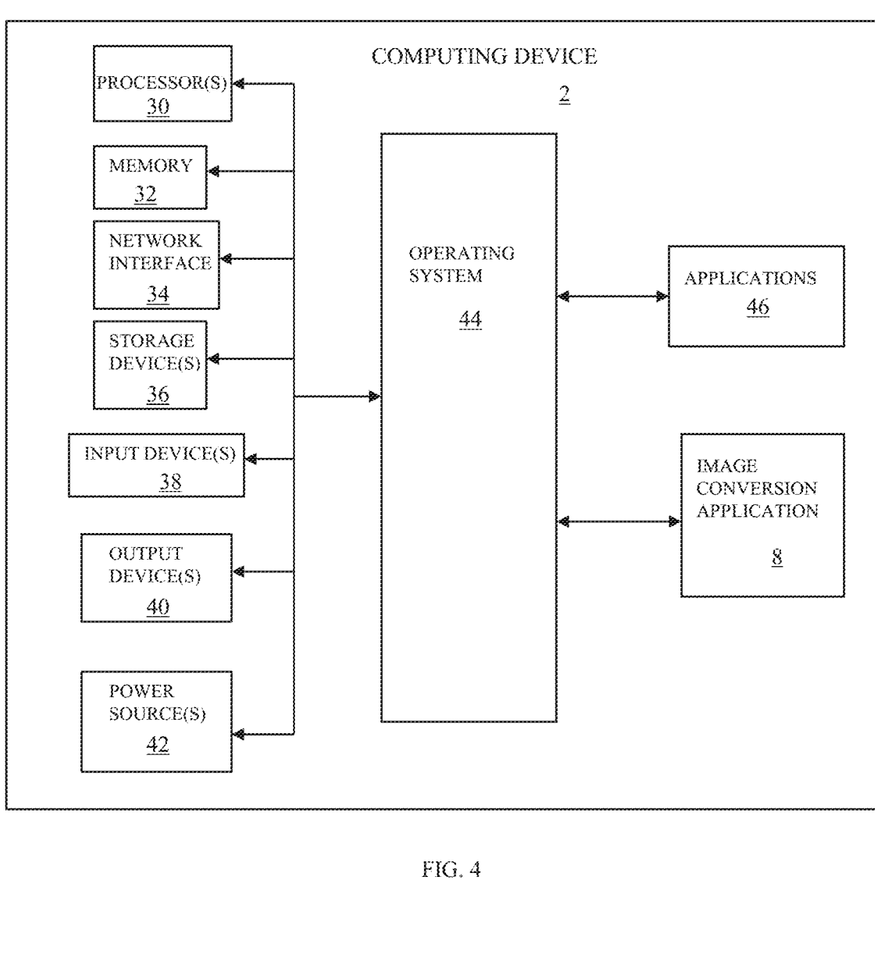
FIG. 4 is a block diagram illustrating an example of a computing device that may execute one or more applications and receive a user input, in accordance with one or more aspects of the present disclosure.

FIG. 4 is a block diagram illustrating details of one example of a computing device 2 that may execute one or more applications, such as a image conversion application 8 which incorporates methods according to the present invention. FIG. 4 illustrates only one particular example of computing device 2, and many other example embodiments of computing device 2 may be used in other instances.

As shown in the specific example of FIG. 4, computing device 2 includes one or more processors 30, memory 32, a network interface 34, one or more storage devices 36, one or more input devices 38, one or more output devices 40, and one or more batteries or other power sources 42. Computing device 2 also includes an operating system 44 executable by computing device 2. Computing device 2 may include one or more applications 46 and difference image application 8 executable by computing device 2. Each of components 30, 32, 34, 36, 38, 40, 42, 44, 46, and 8, may be interconnected (physically, communicatively, and/or operatively) for inter-component communications.

Processors 30 may be configured to implement functionality and/or process instructions for execution in computing device 2. Processors 30 may be capable of processing instructions stored in memory 32 or instructions stored on storage devices 36.

Memory 32 may be configured to store information within computing device 2 during operation. Memory 32 may, in some examples, be described as a non-transitory or tangible computer-readable storage medium. In some examples, memory 32 is a temporary memory, meaning that a primary purpose of memory 32 is not long-term storage. Memory 32 may also, in some examples, be described as a volatile memory, meaning that memory 32 does not maintain stored contents when the computer is turned off. Examples of volatile memories include random access memories (RAM), dynamic random access memories (DRAM), static random access memories (SRAM), and other forms of volatile memories known in the art. In some examples, memory 32 may be used to store program instructions for execution by processors 30. Memory 32 may be used by software or applications running on computing device 2 (e.g., one or more of applications 46) to temporarily store information during program execution.

Storage devices 36 may also include one or more non-transitory or tangible computer-readable storage media. Storage devices 36 may be configured to store larger amounts of information than memory 32. Storage devices 36 may further be configured for long-term storage of information. In some examples, storage devices 36 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Computing device 2 also includes a network interface 34. Computing device 2 may utilize network interface 34 to communicate with external devices via one or more networks, such as one or more wireless networks. Network interface 34 may be a network interface card, such as an Ethernet card, an optical transceiver, a radio frequency transceiver, or any other type of device that can send and receive information. Examples of such network interfaces may include Bluetooth®, 3G and WiFi®, radios in mobile computing devices as well as USB. Examples of such wireless networks may include WiFi®, Bluetooth®, and 3G. In some examples, computing device 2 may utilize network interface 34 to wirelessly communicate with an external device (not shown) such as a server, mobile phone, or other networked computing device.

Computing device 2 may also include one or more input devices 38. Input device 38 may be configured to receive input from a user through tactile, audio, or video input. Examples of input device 38 may include a touch-sensitive screen, mouse, a keyboard, a voice responsive system, video camera, or any other type of device for detecting a command from a user.

One or more output devices 40 may also be included in computing device 2. Output device 40 may be configured to provide output to a user using tactile, audio, or video output. Output device 40 may include a touch-sensitive screen, sound card, a video graphics adapter card, or any other type of device for converting a signal into an appropriate form understandable to humans or machines. Additional examples of output device 40 may include a speaker, a cathode ray tube (CRT) monitor, a liquid crystal display (LCD), or any other type of device that can provide output to a user.

Computing device 2 may include one or more batteries or power sources 42, which may be rechargeable and provide power to computing device 2. One or more power sources 42 may be a battery made from nickel-cadmium, lithium-ion, or any other suitable material. The one or more power sources 42 may be rechargeable and/or the device 2 can be powered via a power supply connection.

Computing device 2 may include operating system 44. Operating system 44 may control the operation of components of computing device 2. For example, operating system 44 may facilitate the interaction of application 46 or difference image application 8 with processors 30, memory 32, network interface 34, storage device 36, input device 38, output device 40, and battery 42.

Any applications, e.g. application 46 or difference image application 8, implemented within or executed by computing device 2 may be implemented or contained within, operable by, executed by, and/or be operatively/communicatively coupled to components of computing device 2, e.g., processors 30, memory 32, network interface 34, and/or storage devices 36.

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium encoded with instructions. Instructions embedded or encoded in an article of manufacture including an encoded computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, computer-readable storage media may comprise non-transitory or tangible media. The term "non-transitory" may indicate that the storage medium is not embodied in a carrier wave or a propagated signal. In certain examples, a non-transitory storage medium may store data that can, over time, change (e.g., in RAM or cache).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and equivalents thereof.

The invention claimed is:

1. A method of processing a plurality of digital images, the method comprising:
    a) receiving an ordered collection of a plurality of input digital images from at least one input device;
    b) identifying a first digital image from the plurality of input digital images as a base image with at least one processor implementing instructions stored in a memory;
    c) forming an empty image strip with the at least one processor implementing instructions stored in the memory;
    d) appending the base image to the image strip with the at least one processor implementing instructions stored in the memory; and
    e) for each additional digital image from the plurality of input digital images,
        i) computing a difference image from the base image and the additional digital image with the at least one processor implementing instructions stored in the memory, and
        ii) appending the computed difference image to the image strip with the at least one processor implementing instructions stored in the memory.

2. The method of claim 1, wherein the method further comprises applying quantization to the image strip to produce a quantized image strip with the at least one processor implementing instructions stored in the memory.

3. The method of claim 1, wherein the method further comprises applying compression to the image strip with the at least one processor implementing instructions stored in the memory.

4. The method of claim 2, wherein the method further comprises applying compression to the quantized image strip with the at least one processor implementing instructions stored in the memory.

5. A method for compression of a plurality of digital images, the method comprising:
    a) receiving a plurality of input digital images from at least one input device;
    b) identifying a first digital image from the plurality of input digital images as a base image with at least one processor implementing instructions stored in a memory;
    c) forming an empty set of output images with the at least one processor implementing instructions stored in the memory; and
    d) for each second digital image from the plurality of input digital images,
        i) upon a condition in which the second image is the base image, adding the base image to the set of output images with the at least one processor implementing instructions stored in the memory, and
        ii) upon a condition in which the second image is not the base image, computing a difference image from the base image and the second image and adding the difference image to the set of output images with the at least one processor implementing instructions stored in the memory e) applying compression to each image in the set of output images to form a set of compressed images with the at least one processor implementing instructions stored in the memory.

6. The method of claim 5, wherein the method further comprises:
applying quantization to each image in the set of output images to form a set of quantized images with the at least one processor implementing instructions stored in the memory.

7. The method of claim 5, wherein each difference image is formed on a per-channel and per-pixel basis.

8. The method of claim 5, wherein each difference image is performed by subtraction with scalar weights and an offset bias.

9. A tangible non-transitory computer-readable medium comprising instructions for causing a programmable processor to perform operations comprising:
a) receiving an ordered collection of input digital images,
b) identifying a first digital image from the ordered collection of input digital images as a base image,
c) forming an empty image strip,
d) for each second digital image from the ordered collection of input digital images, and
  i) upon a condition in which the second image is the base image, appending the base image to the image strip, and
  ii) upon a condition in which the second image is not the base image, computing a difference image from the base image and the second image and appending the difference image to the image strip.

10. The instructions for causing a programmable processor to perform operations of claim 9, further comprising:
applying compression to the image strip.

11. The instructions for causing a programmable processor to perform operations of claim 9, further comprising:
applying quantization to the image strip to produce a quantized image strip.

12. The instructions for causing a programmable processor to perform operations of claim 11, further comprising:
applying compression to the quantized image strip.

13. An image processing system comprising:
at least one input device;
at least one processor that is in communication with input device, the at least one processor configured to,
  receive a plurality of input digital images from the input device,
  attach an ordered collection determination to the received digital images,
  identify a first digital image from the ordered collection of input digital images as a base image,
  form an empty image strip,
  append the base image to the image strip,
  for each additional image in the ordered collection of input images,
    compute a difference image from the base image,
    append the difference image to the image strip, and
    apply a compression to the image strip; and
at least one output device in communication with the at least one processor to provide an output to a user.

14. The image processing system of claim 13, wherein the at least one processor is further configured to apply quantization to the image strip to produce a quantized image strip.

\* \* \* \* \*